Jan. 23, 1940.　　　L. W. COMPTON　　　2,188,240
CONTROLLING MEANS FOR AUTOMATIC WATER SYSTEMS
Filed Oct. 24, 1938　　　2 Sheets-Sheet 1

Loyd W. Compton
INVENTOR
BY Victor J. Evans & Co.
ATTORNEYS

Jan. 23, 1940. L. W. COMPTON 2,188,240
CONTROLLING MEANS FOR AUTOMATIC WATER SYSTEMS
Filed Oct. 24, 1938 2 Sheets-Sheet 2

Loyd W. Compton.
INVENTOR
BY Victor J. Evans & Co.
ATTORNEYS

Patented Jan. 23, 1940

2,188,240

UNITED STATES PATENT OFFICE 2,188,240

CONTROLLING MEANS FOR AUTOMATIC WATER SYSTEMS

Loyd W. Compton, Alexandria, Tenn., assignor of one-fourth to Marvin O. Nixon and one-fourth to Bart N. Nixon, Alexandria, Tenn.

Application October 24, 1938, Serial No. 236,817

4 Claims. (Cl. 103—26)

This invention relates to automatic water systems and more particularly to such systems including an electric motor driven pump, connected to a water source and to a storage tank equipped with a pressure controlled electric switch for automatically stopping and starting the motor in accordance with the pressure within the storage tank.

The invention has for its primary object, in addition to the pressure controlled means for automatically stopping and starting the motor in the maintenance of a predetermined water supply and pressure within the storage tank, the further safety provision of means for automatically stopping the motor and rendering the entire device inoperative when the flow of water from the pump is interrupted from any cause, such as exhaustion and failure of the water source or the breaking of the pump so as not to drive water into the storage tank.

With the foregoing and other objects to be attained, as will hereinafter more fully appear, the invention consists in the novel general structural features and in the particular parts and combinations and arrangements of parts as hereinafter described and set forth with particularity in the appended claims, reference being had to the accompanying drawings, illustrating a practical adaptation of the invention, and in which:

Figure 1:
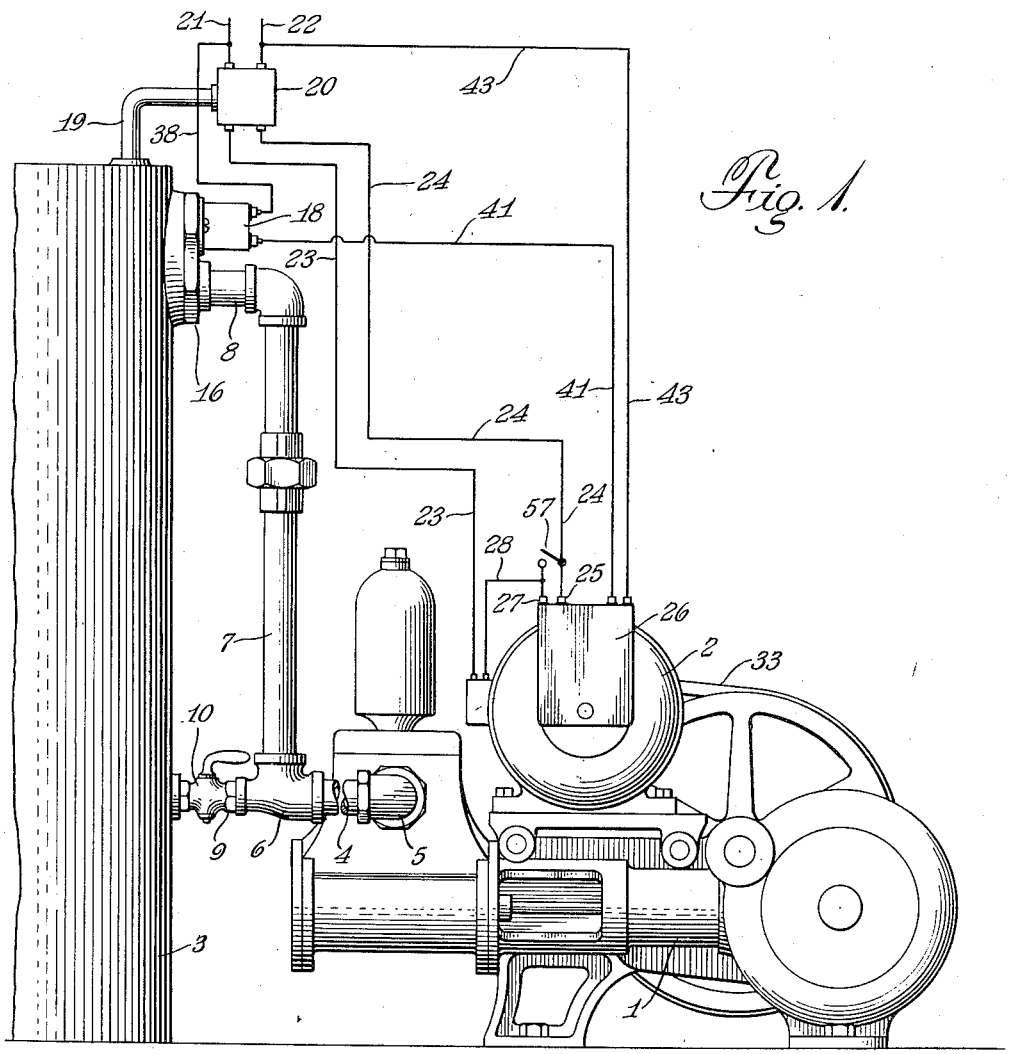
Figure 1 is a view, in side elevation, illustrating the complete apparatus of the system.

Referring now to the drawings, the numeral 1 indicates an ordinary water pump which is driven by an electric motor 2 and connecting a water source (not shown) to a storage tank 3. The connection between the pump and the storage tank, as shown, includes a pipe 4 leading from the pump outlet 5 and connected by an elbow 6 to an upwardly extending pipe 7, which latter is connected at its upper end to the upper portion of the storage tank 3, as at 8, (see Figures 1, 2 and 3). The elbow 6 is also directly connected to the lower portion of the storage tank 3 by a by-pass connection 9 which is provided with a cut-off valve 10 (see Figure 1). The valved by-pass 9 is provided for regulating the flow capacity in the water supply connection to the storage tank and for selectively admitting the preponderance of the water supply into either the upper or the lower portion of the storage tank, at will.

Figure 2:
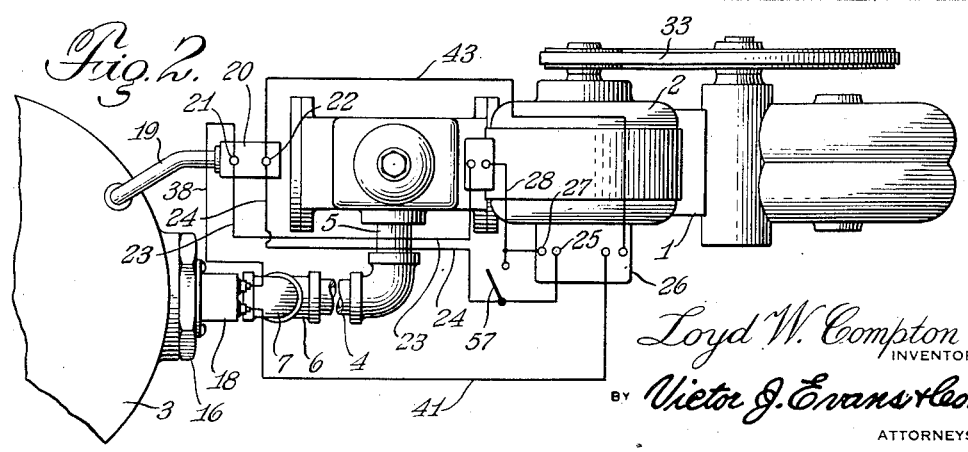
Figure 2 is a top plan view of the apparatus.
Figure 3:
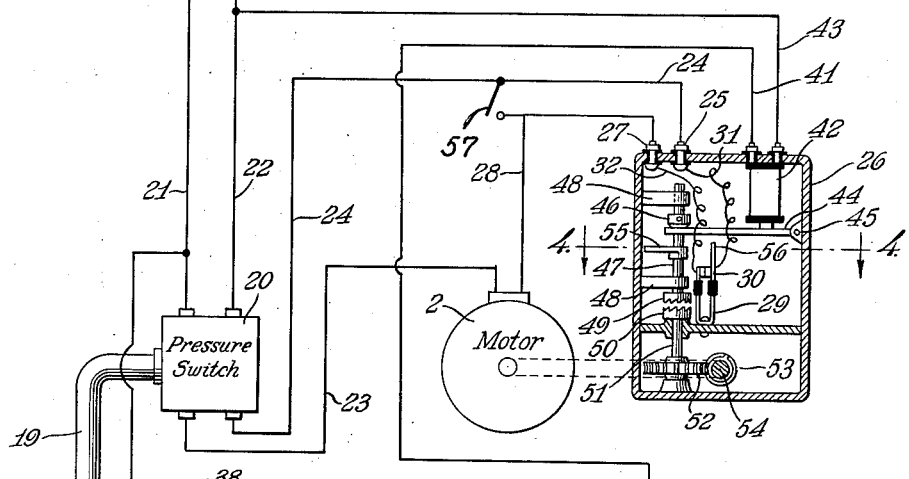
Figure 3 is a view of circuit controlling means, partly in mechanical structure, but more or less conventionally shown, and in electrical diagram.
Figure 4:
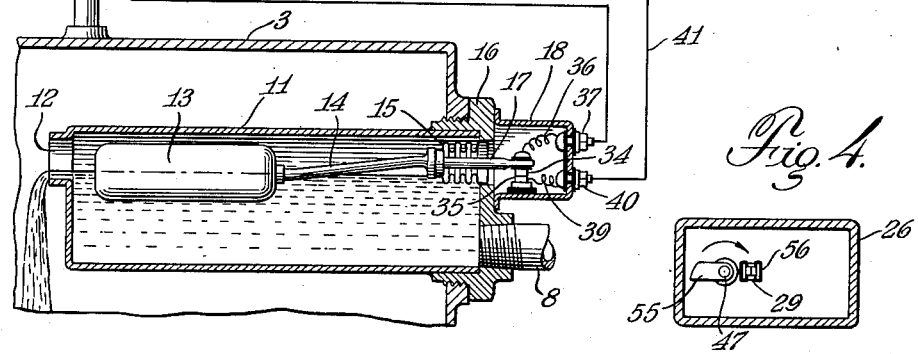
Figure 4 is a cross section of one of the housing elements, taken on or about the line 4—4 of Figure 3.

In the manner of attaching the upper end portion 8 of the conducting pipe 7 to the storage tank 3, as illustrated in Figures 1 to 3, inclusive, said pipe portion 8 enters the lower portion of a receptacle 11 located within the upper portion of the tank (see Figure 3), said receptacle being of cylindrical form and having an over-flow opening 12 in the upper portion of its inner end wall whereby to maintain a body of water within the receptacle at a predetermined level during the time water is being pumped and flowing into the tank. Within the receptacle 11 is a float 13 having an arm 14 which is flexibly supported for universal swinging movement on a metal bellows-like element 15 attached to the head portion 16 provided at the outer end of said receptacle 11, said head portion 16 being screw threaded in an opening provided therefor in the side wall of the tank 3 and thereby supporting the receptacle in a horizontal position. The arm 14 of the float 13 is provided with a stem portion 17 which is projected outwardly through the bellows-like supporting element 15 into a circuit breaker housing 18, said housing being sealed off from the receptacle 11 by said bellows-like element 15 which obviously has a watertight fit in the opening provided for its attachment to the head 16. The housing 18 contains emergency switch elements to be later more fully described.

Leading from an outlet in the top portion of the storage tank 3 is a pipe 19 which is connected to a housing 20 containing a conventional pressure switch (not shown in detail) which is of a self-closing type and is normally closed during the time the storage tank 3 is being filled with water and until a predetermined pressure is created within the tank, said switch being in the main motor circuit and being provided to automatically break the circuit and stop the operation of the motor when the predetermined pressure is created in the storage tank and also automatically closing the circuit and starting the motor when the pressure in the tank decreases to a certain degree.

The pressure switch in the housing 20 is connected at one side to the electrical feed line wires 21 and 22 from a suitable source. Leading from the opposite side of the pressure switch to one circuit terminal of the motor 2 is a circuit wire 23, while from the same side of the pressure switch another circuit wire 24 leads to a terminal 25 of a special auxiliary circuit controlling unit, including a casing designated generally by the numeral 26. The companion terminal 27 of said unit 26 is connected by a circuit wire 28 to the motor circuit terminal opposite to that which is connected by the wire 23 to said pressure switch 20.

Normally, with the pressure switch 20 closed, the motor circuit is completed through a normally closed U-shaped switch 29, the two legs of which are suitably insulated from each other and one leg 30 is connected by a wire 31 to the terminal 25 of the unit 26 to which the circuit wire 24 is also connected, the opposite leg of said switch 29 being connected by a wire 32 to the terminal 27 of said unit 26 to which the circuit wire 28 is also connected.

With the motor circuit closed, as just above described, the pump 1 is actuated and continues to operate until the predetermined pressure is created in the storage tank 3, whereupon the pressure switch 20 is caused to open, as hereinabove described, and thereby breaks the motor circuit, the starting and stopping of the motor 2 being entirely automatic and, under normal conditions, a predetermined water supply under pressure is maintained in the storage tank. However, should the water source become exhausted or fail, or the driving connection, designated generally by the numeral 33, break, or there be a breakdown in the pump itself, whereby the water ceases to flow into the receptacle 11 from the pipe connection 7 and the float 13 is thereby lowered, the stem extension 17 at the end of the float supporting arm 14 is accordingly raised, whereupon a terminal contact member 34 on the end of said stem portion 17 is lifted out of engagement with an opposed contact member 35 mounted upon but insulated from the wall of housing 18, said terminal elements 34 and 35 constituting the emergency switch hereinbefore described.

The terminal element of the stem 17 is connected by a wire 36, within the housing 18, to a terminal member 37 on the end wall of the housing, said terminal element 37 being connected by a circuit wire 38 to the feed line wire 21. The companion terminal element 35 of the emergency switch is connected by a wire 39 to a terminal element 40 on the end wall of the housing 18, said terminal element 40 being connected by a circuit wire 41 to an electro-magnet 42, which is located within the unit housing 26, said magnet being in turn connected by a circuit wire 43 to the feed line wire 22. With the aforesaid circuit of the electro-magnet 42 closed, said electro-magnet is thereby energized and holds a lever arm 44 in a retracted position, said lever arm being hingedly mounted, as at 45, on the side wall of the housing 26, with its free end portion supportingly engaging the underside of a collar 46 fixedly secured on a vertical shaft 47 which is mounted rotatably and with an endwise movement in supporting brackets 48 projecting from the adjacent side wall of the housing 26 (see Figure 3).

On the lower end of the shaft 47 is a clutch head 49 which, in the normal raised position of said shaft 47, is disengaged from an opposed clutch head 50 on the upper end of an aligned shaft 51 rotatably mounted in the lower portion of said unit housing 26, said shaft 51 having a gear 52 fixed thereon and in mesh with a driving worm screw 53, which latter is fixed on a shaft 54. Said shaft 54 is driven in any conventional manner by the motor 2, said driving connection being either an obvious direct extension of the armature shaft of the motor or by any suitably belted or geared connection with said armature shaft, in order that the shaft 51 carrying the clutch member 50 is rotated continuously as the armature shaft is rotated during the operation of the motor.

Upon the failure of the water source or the breakage of the driving connection between the motor 2 and the pump 1, or the break-down of the pump itself, as hereinabove described, resulting in the opening of the emergency switch in the housing 18, the electro-magnet 42 is thereby de-energized, whereupon the lever arm 44 is released from the influence of the electro-magnet and the shaft 47 accordingly gravitates with the lever arm 44 and the clutch head 49 on said shaft 47 engages the head 50 on the shaft 51, which latter is being driven by the motor 2 by reason of the hereinbefore described gear connection with the armature shaft of the motor. With the two clutch heads 49 and 50 thus engaged, the shaft 47 is accordingly rotated with the shaft 51, and a cam arm 55 fixed on said shaft 47 moves into engagement with an upward extension 56 of the leg member 30 of said hereinbefore described auxiliary switch 29 which is a part of the motor circuit. When this occurs, the leg member 30 of the switch 29 is pressed with its contact element out of engagement with the contact element of the opposite leg of the switch, thereby breaking the motor circuit and causing the motor to cease operating, thus rendering the entire apparatus inoperative in the emergency and preventing damage to the motor or pump mechanism which might otherwise occur. Other than this emergency stoppage in the operation of the motor, as just above described, the stopping and re-starting of the motor occurs automatically and intermittently in the maintenance of the water supply under pressure in the storage tank 3, the motor being under the control of the pressure switch unit 20 as hereinbefore described.

Obviously, with the breaking of the motor circuit by the engagement of the cam arm 55 with the extension 56 of the leg 30 of the switch 29, some means must be provided for manually closing the motor circuit externally of the unit housing 26 in order to again start the motor and place the apparatus in working condition. For this purpose a normally open, manually operable switch 57 is provided in order to cross-connect the circuit wires 24 and 28 (see Figures 1 and 3). This switch is closed to originally start the motor, as well as after the emergency stoppage hereinabove described, and is kept closed until the water is flowing into the receptacle 11 in the storage tank 3 and the terminal contact elements 34 and 35 of the switch unit 18 are accordingly brought into engagement with each other to close the circuit of the electro-magnet 42 which thereby effects the lifting of the shaft 47, disengaging the clutch heads 49 and 50, at which time, of course, the shaft 47 has been rotated to move the cam arm 55 out of engagement with the leg extension 56 of the switch 29. After the apparatus is thus placed in operating condition, the manually operable switch 57 is opened and the operation of the apparatus continues under automatic control.

Figure 5:
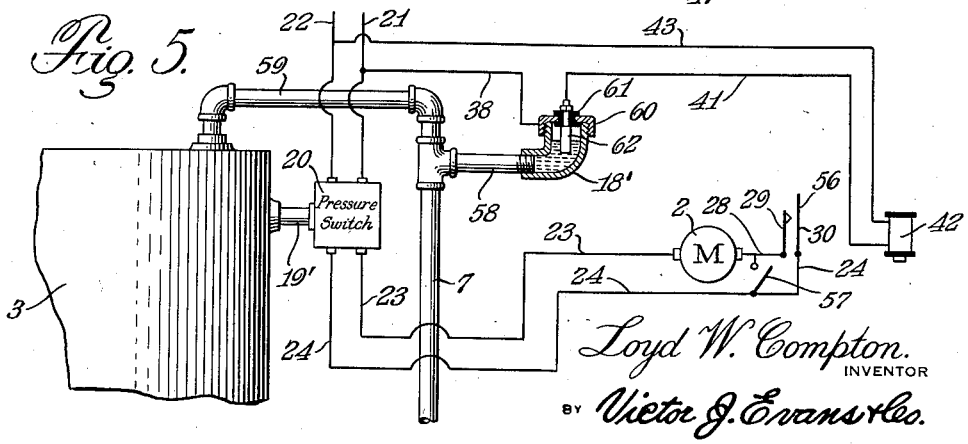
Figure 5 is a view, showing more or less conventionally and in diagram, a modified type and application of controlling means.

In some cases, instead of using the float controlled switch unit 18 shown in Figure 3, a different type of switch may be provided as indicated at 18' in Figure 5. In this modification the unit comprises an elbow casing at the end of a lateral extension 58 of the upright water conducting pipe 7 from the pump 1, said pipe 7, in this instance, being continued upwardly and laterally inward above the lateral extension 58 and connected into the top of the storage tank 3, as at 59. In other respects said pipe 7 is connected at its lower end with the tank 3 through the valve-controlled by-pass substantially as shown in Figure 1. In this modification the pressure controlled switch 20 is communicably connected to the storage tank 3 by a pipe 19' which is tapped into the side of the tank instead of the top thereof as in Figures 1 to 3, inclusive, wherein the pressure controlled switch is connected to the tank by the pipe 19.

The elbow casing 18' is provided with a cap 60 having a porcelain or other insulative bushing 61 carrying an electrode 62 extending downwardly into the casing, said electrode 62 being connected by the circuit wire 41 to the hereinbefore described electro-magnet 42. In this modification the feed line wire 21 is connected by the circuit wire 38 to said casing 18' while the opposite feed line wire 22 is connected by the circuit wire 43 to the electro-magnet 42. The circuit arrangement is substantially the same as that provided in connection with the float-controlled switch unit 18, the only difference being in the type of the switch unit itself, that is to say, in the modification illustrated in Figure 5, the circuit is closed only when water is at a level in the casing 18' to immerse the lower end of the electrode 62, which level is maintained only while the water is flowing through the pipe 7 and its upper extension 59 in the storage tank 3. This type of switch may be used to advantage in systems where the water is of the character containing minerals or impurities of electrical conductivity.

Obviously, the general construction and arrangement of the apparatus and the particular parts thereof admit of considerable modification within the spirit of the invention as defined in the appended claims. The invention, therefore, is not limited to the specific construction and arrangement shown.

What is claimed is:

1. In combination with a water system including an electrical motor-driven pump and a water storage tank having a pressure actuated switch electrically connected in the electrical circuit of the motor of said pump for automatically stopping and starting the pump in accordance with the pressure in the tank, a switch under the control of the water flow from the pump and electrically connected in the motor circuit, a self-closing switch connected in said circuit, a shaft driven by said motor, a second shaft aligning with the first shaft and mounted for rotation and a limited endwise movement, clutch members on the meeting ends of said shafts for connecting and disconnecting them by the endwise movement of the second shaft, electro-magnetic means connected in said circuit and to the water flow controlled switch for effecting endwise movement of the second named shaft and normally holding said shaft away from the first named shaft, but yielding to engage the two shafts when the water flow between the pump and tank ceases with the pressure actuated switch relieved of pressure and acting to maintain the motor in operation, and a trip arm secured to the second named shaft for opening the self-closing switch on the rotation of the second named shaft.

2. In combination with a water system including an electrical motor driven pump and a water storage tank having a pressure actuated switch electrically connected in the electrical circuit of the motor of said pump for automatically stopping and starting the pump in accordance with the pressure in the tank, a switch under the control of the water flow from the pump and electrically connected in the motor circuit, a self-closing switch connected in said circuit, a shaft driven by said motor, a second shaft aligning with the first shaft and mounted for rotation and a limited endwise movement, clutch members on the meeting ends of said shafts for connecting and disconnecting them by the endwise movement of the second shaft, electro-magnetic means connected in said circuit and to the water flow controlled switch for effecting endwise movement of the second named shaft and normally holding said shaft away from the first named shaft, but yielding to engage the two shafts when the water flow between the pump and tank ceases with the pressure actuated switch relieved of pressure and acting to maintain the motor in operation, a trip arm secured to the second named shaft for opening the self-closing switch on the rotation of the second named shaft, and a manually operable switch, normally open during the regular operation of the motor, but closable for originally starting the motor and re-starting the motor after emergency stoppage thereof.

3. In combination with a liquid supply and storage system including an electrical motor driven pump incorporated in a conduit connection to a storage tank from a source of supply and a pressure actuated switch electrically connected in the operating circuit of the motor of the pump for automatically starting and maintaining the motor in operation during the time the pressure in the tank is below a predetermined maximum and reacting to break the circuit when the pressure is raised to such maximum, a liquid flow responsive device constituting a part of the conduit connection between the pump and tank and having means for closing and breaking the operating circuit of the motor separately from said pressure actuated switch, said means acting to close the motor circuit during normal flow of the liquid through the conduit between the pump and tank and automatically breaking the circuit when the flow is below normal whereby to render the pressure actuated switch ineffective if closed and thereby stop the motor.

4. In combination with a liquid supply and storage system including an electrical motor driven pump incorporated in a conduit connection to a storage tank from a source of supply and a pressure actuated switch electrically connected in the operating circuit of the motor of the pump for automatically starting and maintaining the motor in operation during the time the pressure in the tank is below a predetermined maximum and reacting to break the circuit when the pressure is raised to such maximum, supplemental switch means under control of the liquid flow from the pump and electrically connected in the operating circuit of the motor, a cooperating self-closing auxiliary switch connected in said circuit in conjunction with said liquid flow controlled switch, and mechanical means operated by the motor and electrically controlled by the operation of said liquid flow controlled switch for effecting automatic opening of the self-closing switch and breaking the operating circuit of the motor and rendering the pressure actuated switch ineffective if closed when the liquid flow in the conduit connection is below normal.

LOYD W. COMPTON.